(12) United States Patent
Delhagen et al.

(10) Patent No.: US 11,121,396 B2
(45) Date of Patent: Sep. 14, 2021

(54) INTERMEDIATE LAYERS FOR ELECTRODE FABRICATION

(71) Applicant: Amprius, Inc., Sunnyvale, CA (US)

(72) Inventors: William S. Delhagen, San Francisco, CA (US); Rainer J. Fasching, Mill Valley, CA (US); Ghyrn E. Loveness, Mountain View, CA (US); Song Han, Foster City, CA (US); Eugene M. Berdichevsky, Atlanta, GA (US); Constantin Ionel Stefan, San Jose, CA (US); Yi Cui, Stanford, CA (US); Mark C. Platshon, Menlo Park, CA (US)

(73) Assignee: Amprius, Inc., Fremont, CA (US)

( * ) Notice: Subject to any disclaimer, the term of this patent is extended or adjusted under 35 U.S.C. 154(b) by 0 days.

(21) Appl. No.: 16/181,133

(22) Filed: Nov. 5, 2018

(65) Prior Publication Data

US 2019/0181489 A1   Jun. 13, 2019

Related U.S. Application Data

(63) Continuation of application No. 12/944,576, filed on Nov. 11, 2010, now abandoned.

(51) Int. Cl.
*H01M 4/00* (2006.01)
*H01M 10/052* (2010.01)
(Continued)

(52) U.S. Cl.
CPC .......... *H01M 10/052* (2013.01); *H01M 4/13* (2013.01); *H01M 4/134* (2013.01); *H01M 4/366* (2013.01); *H01M 4/661* (2013.01); *H01M 4/1395* (2013.01)

(58) Field of Classification Search
CPC ...... H01M 4/13; H01M 4/134; H01M 4/1395; H01M 4/366; H01M 4/661; H01M 10/052
See application file for complete search history.

(56) References Cited

U.S. PATENT DOCUMENTS

| | | |
|---|---|---|
| 4,366,215 A | 12/1982 | Coetzer et al. |
| 6,004,695 A | 12/1999 | Goda et al. |

(Continued)

FOREIGN PATENT DOCUMENTS

| | | |
|---|---|---|
| CN | 1705148 | 12/2005 |
| CN | 1705418 A | 12/2005 |

(Continued)

OTHER PUBLICATIONS

"Sweet nanotech batteries: Nanotechnology could solve lithium battery charging problems," PhysOrg.com, Received online Mar. 23, 2012 from http://phys.org/news127043619.html.

(Continued)

*Primary Examiner* — Raymond Alejandro
(74) *Attorney, Agent, or Firm* — Weaver Austin Villeneuve & Sampson LLP (57) ABSTRACT

An electrode includes one or more intermediate layers positioned between a substrate and an electrochemically active material. Intermediate layers may be made from chromium, titanium, tantalum, tungsten, nickel, molybdenum, lithium, as well as other materials and their combinations. In certain embodiments, an active material includes one or more high capacity active materials, such as silicon, tin, and germanium. These materials tend to swell during cycling and may loose mechanical and/or electrical connection to the substrate. A flexible intermediate layer may (Continued)

compensate for swelling and provide a robust adhesion interface. Methods of fabricating electrodes involve forming metal silicide nanostructures.

10 Claims, 7 Drawing Sheets

Related U.S. Application Data (60) Provisional application No. 61/260,297, filed on Nov. 11, 2009.

(51) Int. Cl.
*H01M 4/13* (2010.01)
*H01M 4/134* (2010.01)
*H01M 4/36* (2006.01)
*H01M 4/66* (2006.01)
*H01M 4/1395* (2010.01)

(56) References Cited

U.S. PATENT DOCUMENTS

| | | | |
|---|---|---|---|
| 7,816,031 B2 | 10/2010 | Cui et al. | |
| 8,257,866 B2 | 9/2012 | Loveness et al. | |
| 8,338,022 B2* | 12/2012 | Fukui | H01M 10/052 429/164 |
| 8,491,718 B2 | 7/2013 | Chaudhar et al. | |
| 8,556,996 B2 | 10/2013 | Loveness et al. | |
| 9,172,094 B2 | 10/2015 | Loveness et al. | |
| 9,780,365 B2 | 10/2017 | Liu et al. | |
| 10,096,817 B2 | 10/2018 | Loveness et al. | |
| 10,230,101 B2 | 3/2019 | Loveness et al. | |
| 2002/0028384 A1 | 3/2002 | Krasnov et al. | |
| 2002/0072577 A1 | 6/2002 | Jacobsen et al. | |
| 2002/0102461 A1 | 8/2002 | Baker et al. | |
| 2003/0175589 A1 | 9/2003 | Kaminaka et al. | |
| 2003/0178104 A1 | 9/2003 | Sekine | |
| 2004/0023111 A1 | 2/2004 | Ohshita et al. | |
| 2004/0063839 A1 | 4/2004 | Kawate et al. | |
| 2005/0167655 A1 | 8/2005 | Furukawa et al. | |
| 2005/0175901 A1 | 8/2005 | Kawakami et al. | |
| 2005/0279274 A1 | 12/2005 | Niu et al. | |
| 2007/0065720 A1 | 3/2007 | Hasegawa et al. | |
| 2007/0148544 A1 | 6/2007 | Le | |
| 2007/0298168 A1 | 12/2007 | Ajayan et al. | |
| 2008/0008844 A1 | 1/2008 | Bettge et al. | |
| 2008/0213603 A1* | 9/2008 | Kobayashi | B82Y 10/00 428/450 |
| 2008/0261096 A1 | 10/2008 | Kollman et al. | |
| 2008/0280169 A1 | 11/2008 | Niu et al. | |
| 2009/0042102 A1 | 2/2009 | Cui et al. | |
| 2009/0061319 A1 | 3/2009 | Kim et al. | |
| 2009/0176159 A1 | 7/2009 | Zhamu et al. | |
| 2009/0214944 A1 | 8/2009 | Rojeski | |
| 2009/0269511 A1 | 10/2009 | Zhamu et al. | |
| 2010/0043877 A1 | 2/2010 | Wang et al. | |
| 2010/0237272 A1 | 9/2010 | Chaudhar et al. | |
| 2010/0285858 A1 | 11/2010 | Cui et al. | |
| 2010/0310941 A1* | 12/2010 | Kumta | H01B 1/04 429/231.95 |
| 2011/0111300 A1 | 5/2011 | Delhagen et al. | |
| 2011/0111304 A1 | 5/2011 | Cui et al. | |
| 2011/0143019 A1 | 6/2011 | Mosso et al. | |
| 2011/0143210 A1 | 6/2011 | Shimamura et al. | |
| 2011/0143263 A1 | 6/2011 | Shirvanian et al. | |
| 2011/0159365 A1* | 6/2011 | Loveness | H01M 4/386 429/218.1 |
| 2011/0189510 A1 | 8/2011 | Caracciolo et al. | |
| 2012/0070741 A1 | 3/2012 | Liu et al. | |
| 2012/0301789 A1 | 11/2012 | Loveness et al. | |
| 2012/0328942 A1 | 12/2012 | Thomas-Alyea et al. | |
| 2013/0011736 A1 | 1/2013 | Loveness et al. | |
| 2013/0344383 A1 | 12/2013 | Loveness et al. | |
| 2016/0013483 A1 | 1/2016 | Loveness et al. | |
| 2017/0098819 A9 | 4/2017 | Loveness et al. | |
| 2018/0090755 A1 | 3/2018 | Liu et al. | |
| 2019/0273252 A1 | 1/2019 | Loveness et al. | |

FOREIGN PATENT DOCUMENTS

| | | |
|---|---|---|
| CN | 1979828 A | 6/2007 |
| CN | 101010780 | 8/2007 |
| CN | 101560694 | 10/2009 |
| CN | 101953014 | 1/2011 |
| CN | 1476645 A | 2/2014 |
| JP | 2008-305781 | 12/2008 |
| JP | 2013-521621 | 6/2013 |
| JP | 2012556203 | 6/2013 |
| JP | 6250538 | 12/2017 |
| WO | 2009/129490 | 10/2009 |
| WO | 2010/129910 | 11/2010 |
| WO | 2011/015174 | 2/2011 |
| WO | 2011/053553 | 5/2011 |
| WO | 2011/066818 | 6/2011 |
| WO | 2011/094642 | 8/2011 |
| WO | 2012/054767 | 4/2012 |

OTHER PUBLICATIONS

U.S. Appl. No. titled "Template Electrode Structures for Depositing Active Materials" U.S. Appl. No. 14/859,125, filed Sep. 18, 2015.
U.S. Final Office Action dated Dec. 31, 2019, issued in U.S. Appl. No. 15/694,470.
KR Search Report issued in Application No. 10-2014-7002762 dated May 9, 2019.
KR Office Action dated Sep. 17, 2019 for application No. 10-2014-7002762.
International Preliminary Report on Patentability issued in Application No. PCT/US2010/056154 dated May 24, 2012.
U.S. Office Action dated Sep. 20, 2020, issued in U.S. Appl. No. 16/264,456.
U.S. Notice of Allowance dated Jan. 25, 2021, issued in U.S. Appl. No. 16/264,456.
U.S. Office Action dated Oct. 9, 2020, issued in U.S. Appl. No. 15/694,470.
International Search Report and Written Opinion issued in Application No. PCT/US2010/056154 dated Jul. 22, 2011.
U.S. Appl. No. 12/437,529, "Electrode including nanostructures for rechargeable cells," Cui et al., filed May 7, 2009.
Kasavajjula et al., "Nano-and blk-silicon-based insertion anodes for lithium-ion secondary cells," J. Power Sources 163, 1003-1039 (2007).
WO patent application No. PCT/US2012/045313, International Search Report and Written Opinion dated Jan. 21, 2013.
Chan, Candace et al., "High-performance lithium battery anodes using silicon nanowires," Nature nanotechnology, vol. 3, Jan. 2008, published online Dec. 16, 2007.
Pre-Issuance Submission by Third Party dated Jan. 21, 2014, received in U.S. Appl. No. 13/540,484.
U.S. Office Action dated Jan. 31, 2014, issued in U.S. Appl. No. 13/340,484.
P. Chaudhari et al., Hereroepitaxial Silicon Film Growth at 600C from an Al-Si Eutectic Melt, pp. 5368-5371, Mar. 19, 2010, Thin Solid Films, Elsevier, USA.
Pre-Issuance Submission by Third Party dated Jan. 14, 2014, received in U.S. Appl. No. 12/944,576.
Pre-Issuance Submission by Third Party dated Jan. 15, 2014, received in U.S. Appl. No. 12/944,576.
CN Office Action dated Apr. 2, 2014, issued in Application No. 201080056933.2.
EP Search Report issued in Application No. 12807729.4 dated Feb. 5, 2015.
CN Office Action dated Dec. 23, 2014, issued in Application No. 201080056933.2.
CN Office Action issued in Application No. 201280038037.2 dated Aug. 5, 2015.

(56) References Cited

OTHER PUBLICATIONS

EP Search Report issued in Application No. 12807729.4 dated Jun. 2, 2015.
U.S. Office Action dated Sep. 17, 2015, issued in U.S. Appl. No. 13/340,484.
CN Office Action dated Jul. 29, 2015, issued in Application No. 201080056933.2.
U.S. Final Office Action dated Apr. 27, 2016, issued in U.S. Appl. No. 13/340,484.
CN Office Action issued in Application No. 201280038037.2 dated May 26, 2016.
CN Office Action issued in Application No. 2014-51923 8 dated May 31, 2016.
U.S. Office Action dated Jan. 8, 2016, issued in U.S. Appl. No. 13/540,484.
WO patent application No. PCT/US2011/026816, International Search Report and Written Opinion dated Oct. 18, 2011.
Office Action dated Apr. 5, 2012 for U.S. Appl. No. 13/039,031.
Notice of allowance dated Jul. 26, 2012 for U.S. Appl. No. 13/039,031.
"Sweet nanotech batteries: Nanotechnology could solve lithium battery charging problems," PhysOrg.com, Received online Mar. 23, 12 from http: //phys.Org/news127043619.html.
Lee et al., "Anomalous growth and characterization of carbon-coated nickel silicide nanowires," Chemical Physics Letters 3 84, 2004, pp. 215-218.
U.S. Office Action dated Sep. 17, 2012 issued in U.S. Appl. No. 13/540,484.
Quasi-2D Structures Make Better Batteries, Tyrell, James, Apr. 17, 2008, pp. 1-2.
Nickel Silicide Nanobelts and Sheets in Li-ion Anodes Capacity, Green Car Congress, Apr. 19, 2009, pp. 1-3.
U.S. Appl. No. 13/540,484, Notice of Allowance dated Feb. 22, 2013.
U.S. Appl. No. 13/914,491, Office Action dated Dec. 3, 2014.
U.S. Appl. No. 13/914,491, Notice of Allowance dated Jun. 19, 2015.
JP patent application No. 2012-556203, Office Action dated Aug. 26, 2014.
CN patent application No. 201180019460.3, Office Action dated Jul. 2, 2014.
TW patent application No. 100120247, Office Action dated Feb. 9, 2015.
CN patent application No. 201180019460.3, Office Action dated May 6, 2015.
JP patent application No. 2012-556203, Office Action dated Jul. 14, 2015.
U.S. Appl. No. 13/277,821, Office Action dated Feb. 25, 2013.
U.S. Appl. No. 13/277,821, Office Action dated Oct. 11, 2013.
U.S. Appl. No. 13/277,821, Office Action dated Apr. 10, 2014.
U.S. Appl. No. 13/277,821, Final Office Action dated Nov. 20, 2014.
Cui, Li-Feng et al., "Crystalline-amorphous core-shell silicon nanowires for high capacity and high current battery electrodes," Nano Letters, 2009, vol. 9, No. 1 491-495, Dec. 23, 2008.
U.S. Appl. No. 13/914,491, Notice of Allowance dated Jul. 19, 2015.
U.S. patent application titled "Template Electrode Structures for Depositing Active Materials" U.S. Appl. No. 14/859,125, filed Sep. 18, 2015.
TW Office Action issue in Application No. 100138369, dated Dec. 22, 2015.
U.S. Appl. No. 13/277,821, Decision on Appeal dated Oct. 18, 2016.
CN Office Action issued in Application No. 201280038037.2 dated Feb. 6, 2017.
JP Office Action issued in Application No. 2014-519238 dated Feb. 7, 2017.
U.S. Appl. No. 13/277,821, Notice of Allowance dated Jan. 4, 2017.
CN patent application No. 11751259.0, Extended Search Report dated Mar. 16, 2017.
CN patent application No. 201510674597.2, Office Action and Search Report dated Mar. 28, 2017.
JP patent application No. 2016-077671, Office Action dated Jul. 4, 2017.
CN patent application No. 11751259.0, Office Action dated Dec. 12, 2016.
EP Search Report issued in Application No. 12807729.4 dated Jan. 11, 2017.
Sun et al., "Synthesis of Nickel Mono-Silicide Nanowire by Chemical Vapor Deposition on Nickel Film: Role of Surface Nickel Oxides," Japanese Journal of Applied Physics, vol. 48, No. 4, Apr. 1, 2009, p. 84C138, XP855323364,.
TW Office Action issued in Application No. 105142724 dated Nov. 13, 2017.
U.S. Office Action dated Oct. 16, 2017, issued in U.S. Appl. No. 13/340,484.
Office Action dated Jan. 2, 2018 for U.S. Appl. No. 14/859,125.
KR patent application No. 10-2012-7024928, Office Action dated Aug. 28, 2017.
U.S. Notice of Allowance dated Feb. 12, 2018, issued in U.S. Appl. No. 13/540,484.
KR Search Report issued in Application No. 10-2014-7002762 dated Jul. 27, 2018.
WO patent application No. PCT/US2011/057159, International Search Report and Written Opinion dated Jun. 11, 2012.
U.S. Appl. No. 13/277,821, Notice of Allowance dated Jun. 1, 2017.
US Office Action dated Apr. 16, 2019, issued in U.S. Appl. No. 15/694,470.
Carbon nanofiber product sheet, Applied Science 2008, downloaded from http://www.apsci.com/ngm-pyrol.html on May 2011,.
Pre-Issuance Submission by Third Party dated Jan. 15, 2014, received in U.S. Appl. No. 13/914,491.
Chaudhari, P. et al. "Heteroepitaxial silicon film growth at 600 degree °C for an Al-Si eutectic melt," Thin Solid Films 518 (2010) 5368-5371.
JP patent application No. 2016-077671, Office Action dated May 29, 2018.
EP Office Action issued in Application No. 11751259.0 dated May 23, 2018.
Bierman, et al., "Potential applications of hierarchical branching nanowires in solar energy conversion," Energy & Environmental Science, vol. 2, No. 10, Jan. 1, 2009 (Jan. 1, 2009), pp. 1050-1059,.
Doerk et al., "Growth of branching Si nanowires seeded by Au-Si surface migration," Journal of Materials Chemistry, vol. 18, No. 44, Jan. 1, 2008 (Jan. 1, 2008), pp. 5376-5381.
Final Office Action dated Jul. 16, 2018 for U.S. Appl. No. 14/859,125.
Notice of Allowance dated Oct. 24, 2018 for U.S. Appl. No. 14/859,125.
KR Office Action dated Jan. 21, 2019 for application No. 10-2018-7028397.
U.S. Appl. No. 16/264,456, filed Jan. 31, 2019, Loveness.

\* cited by examiner

INTERMEDIATE LAYERS FOR ELECTRODE FABRICATION

CROSS-REFERENCE TO RELATED APPLICATIONS

This application is a continuation of and claims priority to U.S. application Ser. No. 12/944,576 (now abandoned), filed Nov. 11, 2010, entitled "INTERMEDIATE LAYERS FOR ELECTRODE FABRICATION," which claims the benefit of U.S. Provisional Application No. 61/260,297, filed Nov. 11, 2009, entitled "INTERMEDIATE LAYERS FOR ELECTRODE FABRICATION," each of which is incorporated herein by reference in its entirety and for all purposes.

BACKGROUND

The demand for high capacity rechargeable batteries is strong. Many areas of application, such as aerospace, medical devices, portable electronics, and automotive, require high gravimetric and/or volumetric capacity cells. Lithium ion battery technology represents a significant improvement in this regard. However, to date, application of this technology has been primarily limited to graphite electrodes, and graphite has a theoretical capacity of only about 372 mAh/g during lithiation.

Silicon, germanium, tin, and many other materials are attractive active materials because of their high electrochemical capacity. For example, the theoretical capacity of silicon in lithium ion cells has been estimated at about 4200 mAh/g. Yet many of these materials not been widely adopted in commercial batteries. One reason is the substantial change in volume they undergo during cycling. For example, silicon swells by as much as 400% when charged to a level at or near its theoretical capacity ($Li_{4.4}Si$). Volume changes of this magnitude can cause substantial stresses in active material structures resulting in fractures and pulverization, loss of electrical connections within the electrode, and capacity fading of the battery.

Conventional methods of electrode fabrication using slurries, where slurries include high capacity active material particles and polymer binders, typically result in electrochemical cells with poor cycle life. Most polymer binders are not sufficiently elastic to accommodate active material's swelling, which results in separation between polymers and active material particles during the discharge and loss of electrical connection between the active material particles and the current collector.

Overall, there is a need for improved application of high capacity active materials in battery electrodes that minimize the drawbacks described above.

SUMMARY

Provided are novel electrodes for use in lithium ion batteries. An electrode includes one or more intermediate layers positioned between a substrate and an electrochemically active material. Intermediate layers may be made from chromium, titanium, tantalum, tungsten, nickel, molybdenum, lithium, as well as other materials and their combinations. An intermediate layer may protect the substrate, help to redistribute catalyst during deposition of the electrochemically active material, improve adhesion between the active material and substrate, and other purposes. In certain embodiments, an active material includes one or more high capacity active materials, such as silicon, tin, and germanium. These materials tend to swell during cycling and may loose mechanical and/or electrical connection to the substrate. A flexible intermediate layer may compensate for swelling and provide a robust adhesion interface. Provided also are novel methods of fabricating electrodes containing one or more intermediate layers.

In certain embodiments, an electrode for use in a lithium ion battery includes a substrate, one or more intermediate layers formed on the substrate, and an electrochemically active material in the form of nanostructures formed over the one or more intermediate layers and operable for inserting and removing lithium ions during battery cycling. The electrochemically active material is in electrical communication with the substrate. In certain embodiments, a substrate includes one or more of the following materials: copper, nickel, aluminum, stainless steel, and titanium. In the same or other embodiments, the active material includes one or more of the following materials: silicon, tin, germanium, a silicon-germanium combination, tin oxide, silicon oxycarbide (SiOC), and their compounds. In more specific embodiments, the active material includes silicides or, even more specifically, nickel silicides. For example, an active material may include nickel silicide nanowires with an amorphous silicon layer formed over the nanowires. In certain embodiments, the active material nanostructures are substrate-rooted nanowires.

In certain embodiments, one or more intermediate layers include one or more of the following elements: chromium, titanium, tantalum, tungsten, nickel, molybdenum, iron, and lithium. A thickness of the intermediate layers may be between about 1 nanometer and 2000 nanometers. An electrical resistance over a unit of surface area of the intermediate layers may be less than about 1 Ohm-centimeter squared.

In certain embodiments, one or more intermediate layers include a diffusion barrier layer configured to shield the substrate during formation of the electrochemically active material. In the same or other embodiments, the intermediate layers include an adhesion layer configured to maintain mechanical connection between the substrate and the electrochemically active material during battery cycling. An intermediate layer may have a surface tension configured for depositing a catalyst layer and forming catalyst islands from the catalyst layer during formation of the active material. In the same or other embodiments, one or more intermediate layers are configured to separate catalyst particles from a carrier fluid. An intermediate layer may include an exposed surface having a roughness that enables distribution of a catalyst in discreet patches. An intermediate layers may have a surface condition providing nucleation sites for facilitating deposition of the electrochemically active material.

Provided also a method of manufacturing a battery electrode for use in a lithium ion battery. A method may involve receiving a substrate for the battery electrode, forming a conductive intermediate layers on the substrate, and depositing an electrochemically active material comprising nanowires on the one or more intermediate layers. The electrochemically active material is configured for inserting and removing lithium ions during battery cycling. Depositing the electrochemically active material may involve a vapor-solid-solid chemical (VLS) vapor deposition (CVD) technique. In certain embodiments, depositing the active material involves first depositing a catalyst on the one or more intermediate layers. Two or more intermediate layers may be deposited. In certain embodiments, an intermediate layer includes a surface condition that enhances nucleation of the active material during the deposition of the active material.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Introduction

Instead of binding active materials to a substrate using a polymer binder as is conventionally done in lithium ion battery manufacturing, active materials may be attached directly to the current collecting substrate either during their fabrication by deposition or otherwise (thereby producing "growth rooted" active materials) or after their fabrication (by, e.g., sintering or otherwise fusing). In certain embodiments, a surface of the substrate may need to be protected during the fabrication or attachment process. The reasons for needing such protection, as well as techniques for applying such protection are described below. For now, it should be understood that the protection is provided by one or more "intermediate layers" interposed between the electrode substrate and the active materials. It should also be understood that the active material is often in the form of a small particles or "nanostructures," which will be described in more detail below.

High capacity active materials generally experience substantial volume change during electrochemical cycling of the cell. Such active materials may loose electrical and mechanical connection with the substrate leading to cell degradation. One way to address this issue is by bonding the active materials, which may be in the form of nanostructures, to the substrate. In some cases, the active material attaches to the substrate in a manner referred to as "substrate-rooting." This arrangement provides direct mechanical support and electrical communication between the substrate and active materials; often this will provide a metallurgical connection (which does not necessarily mean that the connection is lattice matched) and/or electrical coupling (and/or connection) between the substrate and the active materials. Various examples of the substrate-rooted nanostructures and corresponding fabrication methods are described in U.S. patent application Ser. No. 12/437,529 filed on May 7, 2009, which is incorporated by reference herein in its entirety for purposes of describing substrate rooted nanostructures.

In certain embodiments, nanostructures have one dimension that is substantially larger than the other two. The largest dimension is referred to as a length. Some nanostructures, especially ones with high aspect ratios, may have curved shapes. In these cases, the length of the nanostructure is the length of the representative curve. A cross-section is defined as a profile of a nanostructure in a plane perpendicular to the length. Nanostructures may have many varying cross-sectional (transverse) dimensions along their lengths. Further, an active layer may have nanostructures with different cross-sections, both shapes and dimensions (e.g., tapered nanostructures). Examples of nanostructure shapes include spheres, cones, rods, wires, arcs, saddles, flakes, ellipsoids, tapes, etc.

Cross-sectional shapes are generally dependent on compositions, crystallographic structures (e.g., crystalline, polycrystalline, amorphous), sizes, deposition process parameters, and many other factors. Shapes may also change during cycling. Irregularities of cross-sectional shapes require a special dimensional characterization. For the purposes of this application, a cross-section dimension is defined as a distance between the two most separated points on a periphery of a cross-section that is transverse to the principal dimension, such as length. For example, a cross-section dimension of a cylindrical nano-rod circle is the diameter of the circular cross-section. In certain embodiments, a cross-section dimension of nanostructures is between about 1 nanometer and 10,000 nanometers. In more specific embodiments, a cross-section dimension is between about 5 nanometers and 1000 nanometers, and more specifically between 10 nanometers and 400 nanometers. Typically, these dimensions represent an average or mean across the nanostructures employed in an electrode.

In certain embodiments, nanostructures are hollow. They may be also described as tube or tube-like structures. Therefore, the cross-sectional profile of these hollow nanostructures includes void regions surrounded by annular solid regions. An average ratio of the void regions to the solid regions may be between about 0.01 and 100, more specifically between about 0.01 and 10. The cross-section dimension of the hollow nanostructures may be substantially constant along the principal dimension (e.g., typically the axis). Alternatively, the hollow nanostructures may be tapered along the principal dimension. In certain embodiments, multiple hollow nanostructures may form a core-shell arrangement similar to multiwall nanotubes. Additional examples of hollow nanostructures are provided in U.S. patent application Ser. No. 12/787,138, entitled "INTERCONNECTED HOLLOW NANOSTRUCTURES CONTAINING HIGH CAPACITY ACTIVE MATERIALS FOR USE IN RECHARGEABLE BATTERIES" filed on May 10, 2010, which is incorporated herein by reference in its entirety for purposes of describing hollow nanostructures.

In certain embodiments, a "nanowire" is defined as a structure that has, on average, an aspect ratio of at least about four. In certain examples, the average aspect ratio may be at least about ten, at least about one hundred, or even at least about one thousand. In some cases, the average nanowire aspect ratio may be at least about ten thousand, and can even reach about one hundred thousand. Nanowire active materials can undergo substantial swelling without disrupting the overall structure of the active layer, provide better electrical and mechanical connections with the layer, and can be easily realized using the vapor-liquid-solid and vapor-solid template free growth methods or other templated methods.

Substrate-rooted nanostructures may be deposited on a substrate using various methods. One such method is a chemical-vapor deposition (CVD) that employs a vapor-liquid-solid (VLS) phase transformation of a deposited material. This approach will be referred to herein as a "VLS" technique. Another method includes a CVD with a vapor-solid-solid (VSS) phase transformation, referred to herein as a "VSS" technique.

In various embodiments, an intermediate layer is positioned between the substrate and the active material to facilitate the fabrication or use of a lithium negative electrode. In one example, an intermediate layer serves to protect the substrate from reactants used to deposit the active material. Such intermediate layer may also (or alternatively) facilitate formation of the active material by VLS or other suitable process. It may accomplish this by, e.g., preventing a deposition catalyst from being contaminated by materials diffusing from the substrate or prevent catalyst defusing into the substrate.

A general description of a VLS process is provided here to better understand certain functions and structures of intermediate layers and other components of the electrode, in accordance with certain embodiments. VLS is a mechanism for the growth of one-dimensional structures, such as nanowires, from CVD. The VLS process introduces a catalytic liquid alloy phase, which can rapidly adsorb a precursor vapor to super-saturation levels, and thereby facilitate crystal growth at the liquid-solid interface.

Figure 1:
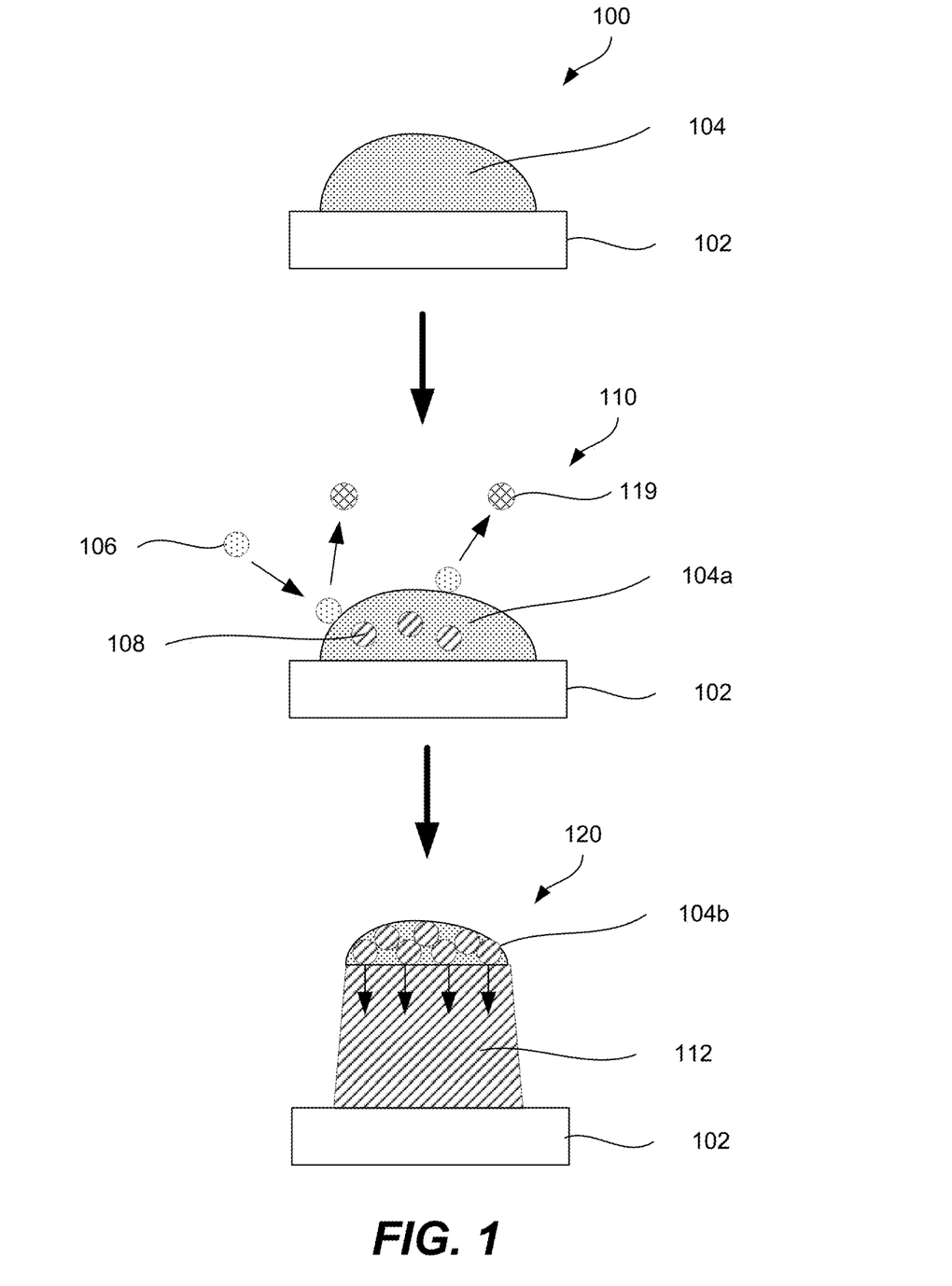
FIG. 1 illustrates three general stages a Vapor Liquid Solid (VLS) deposition process in accordance with certain embodiments.

FIG. 1 illustrates three general stages of a typical VLS deposition process in accordance with certain embodiments. During the initial stage 100, discrete catalyst islands 104 are formed on the surface of the substrate 102. The surface typically has an intermediate layer, not shown, which is described below in more detail.

A substrate may be a metallic foil, an open structure substrate (e.g., mesh, foam), a composite that include structural and conductive materials, and other forms. Substrate materials for electrodes used in various lithium ion cells may include copper and/or copper dendrite coated metal oxides, stainless steel, titanium, aluminum, nickel (also used as a diffusion barrier), chromium, tungsten, metal nitrides, metal carbides, metal oxides, carbon, carbon fiber, graphite, graphene, carbon mesh, conductive polymers, or combinations of above including multi-layer structures. It will be understood by one having ordinary skills in the art that selection of the materials also depends on electrochemical potentials of the materials. The substrate material may be formed as a foil, films, mesh, laminate, wires, tubes, particles, multi-layer structure, or any other suitable configurations. For example, the substrate 102 may be a stainless steel foil having thickness of between about 1 micrometer and 50 micrometers. In other embodiments, the substrate 102 is a copper foil with thickness of between about 5 micrometers and 50 micrometers. Certain substrate examples are described in U.S. patent application Ser. No. 12/437,529 filed on May 7, 2009 and U.S. Patent Application 61/260,292 filed herewith, which are incorporated by reference herein in their entirety for purposes of describing substrates.

The catalyst islands 104 may be formed by first depositing a continuous layer containing catalyst and then removing parts of the layer (by, e.g., using lithographic etching, ablating) or breaking the continuous layer by thermal annealing. An intermediate layer may be used to protect the substrate during this removal. In other embodiments, a continuous or partial layer containing catalyst (typically, a eutectic alloy containing metallic catalyst, such as gold) is heated, which leads to formation of discrete droplets due to the surface tension. An intermediate layer may be used to change the surface properties of the substrate, to form a eutectic alloy with catalyst containing material, prevent catalyst losses into the substrate (e.g., a gold catalyst over the copper substrate), and other purposes. Some properties that may impact formation of discontinuous catalyst islands include surface roughness, grain structure and porosity, magnetic orientation, and electronic structure.

An intermediate layer may contain a catalyst, which may be, e.g., plated, sputtered, and/or evaporated on the intermediate layer. In certain embodiments, materials of the intermediate layer and catalyst may be deposited together and then subjected to phase separation to control distribution of the materials in this combined layer. Nano and/or micro crystals may occur near or at the exposed surface of the intermediate layer. The size of the crystals may be controlled during the deposition process. For exampled, the power level, chamber pressure, and/or temperature may be controlled during sputtering. If plating is used for deposition of the materials, then plating currents and bath composition can be controlled. Furthermore, certain post deposition treatment parameters (e.g., temperature and/or duration for annealing) may be controlled. As resulting distribution of the catalyst on the surface effect density and size of nanowires in some of these embodiments.

In certain embodiments, roughness of the intermediate layer and formation of catalyst islands is established by chemical etching. Etchant may be introduced after the deposition of the intermediate later or during such deposition (e.g., close the end of the deposition) and react with the intermediate layer to create rougher surface and form catalyst islands.

Further, an intermediate layer may have portions with different chemical or physical properties (e.g., polarization, binding sites, magnetic properties), which can be used to distribute catalysts particles or to form islands during a deposition process.

In certain embodiments, catalyst containing materials may be deposited on a substrate as discrete catalyst islands without first forming a continuous layer. For example, a slurry solution with catalyst particles and/or a catalyst suspension (e.g., a colloid suspension) may be used to coat the substrate surface. The slurry is then dried to form catalyst islands. Certain details of these embodiments are described in U.S. patent application Ser. No. 11/103,642 filed on Apr. 12, 2005, which is incorporated herein in its entirety for purposes of describing process examples of forming catalyst islands. In these embodiments, intermediate layers mat be used to provide desirable surface properties for slurry flow and drying and protect the substrate from the slurry. In other embodiments, catalytic materials are embedded onto the intermediate layer such that only a portion of the catalyst material is exposed. Other methods for depositing a catalyst include electroless deposition and mixing a salt precursor with catalyst elements followed by heating or annealing the mixtures with a presence of hydrogen.

Materials suitable for the catalyst include any materials capable of reacting and forming a compound with the process gas in, for example, VLS or VSS types of deposition processes. Examples include gold, nickel, cobalt, aluminum, copper, gallium, indium, silver, titanium, carbon, carbides, alloys, and mixtures of thereof. Catalysts can be deposited using thermal evaporation, sputtering, electroplating, and filtration methods, etc. Depending on the deposition condition, either a continuous film or discrete catalyst islands form on the intermediate layer In certain embodiments, deposition using evaporation or sputtering of catalyst over a rough surface of the substrate or an intermediate layer creates shadowing effects, which results in clustered deposition. This may eliminate a need for a separate post-deposition treatment to create catalyst islands. Further, platting on rough surfaces may result in preferential deposition on the extending tips of the rough surface structure caused by uneven field distribution.

In certain embodiments, depositing small amounts of certain catalyst materials on certain surfaces (e.g. gold on silicon oxides and/or silicon) do not form a homogenous single atomic layer and instead deposit in clusters. Without being restricted to any particular theory, it is believed that thermodynamic driving forces of the surface tension effect such distribution). Clustering may be controlled by controlling deposition process conditions, such as temperature and deposition rate.

In certain embodiments, plating on partially oxidized surfaces or surfaces with a porous template (e.g., porous polymers) on the top of it (porous polymer) is used to form catalyst islands. For example, a substrate or an intermediate layer may be partially oxidized by heating at ambient conditions or by introducing an oxidizing agent into the deposition chamber. Alternatively or in addition to this method, a surface may be then coated with a polymer that forms a porous structure during the deposition or during subsequent treatment (e.g., heating).

In certain embodiments, pulse plating of the catalyst may results in catalyst islands formed on the surfaced. For example, relatively short pulse duration can be used to form a discontinuous film. The duration of the pulse depends on the plating bath configuration, plating currents, plating bath composition, deposition surface materials and geometry (e.g., surface roughness), and other process parameters.

In certain embodiments, a partial electrochemical dissolution of the catalyst layer is used to form islands of the metal. For example, a pulsed current, a template, roughening or oxidizing the surface may be used to establish selective dissolution.

Various criteria may be taken into account in selecting catalyst materials. Such criteria include melting and eutectic points with nanostructure materials, wetting properties such as surface tension on the intermediate layer (to form catalyst islands upon melting), bulk diffusivity in the intermediate layer, impact on electrochemical and electrical properties of deposited nanostructures, and others. For example, aluminum has lower diffusivity in crystalline silicon than gold but also makes a eutectic with silicon, though at higher temperature than gold (about 577° C.). Copper, in turn, diffuses very fast in silicon but has even higher eutectic (about 802° C.). Copper may be used to grow silicon nanowires in a Vapor-Solid-Solid mode. Further, gallium has both low melting temperature and low diffusivity in silicon in comparison to gold.

In the next stage 110 of the VLS process, one or more precursor gases 106 are provided to the surface of the substrate 102 containing catalyst islands 104a. These precursor gases can decompose or otherwise react to form electrochemically active materials, such as silicon, germanium, silicon-germanium alloys (SiGe), silicon oxycarbide (SiOC), tin, tin oxide, titanium oxide, carbon, a variety of metal hydrides (e.g., $MgH_2$), silicides, phosphides, carbides and nitrides, that later form nanostructures 112. The precursor gases 106 react at the surface of the catalyst islands 104 releasing certain materials 108 that are adsorbed by the islands 104a and other materials 119 and then released to the environment. This process is sometimes referred to as a dissociative chemisorption. For example, silane ($SiH_4$) decomposes at high temperatures or with an assist of plasma to produce silicon, silane radical, and hydrogen. Deposited silicon or silicon-containing material then diffuses into the catalyst islands and form alloys with the catalysts. Another example is chloride based silane such as dichloride, trichloride, and tetrachloride silane. Chlorosilanes ($H_xSiCl_{4-x}$) may react with hydrogen ($H_2$) on the surface of a gold containing catalyst island and release silicon (Si) into the islands and hydrogen chloride (HCl) into environment of the processing chamber.

As the dissociative chemisorption process continues, the catalyst islands 104a increase the concentration of the adsorbed materials 108 until it reaches the saturation level. At this point, shown in the next stage 120, further adsorption of the material 108 causes precipitation of this material at the substrate interface leading to formation of a solid nanostructure 112. This nanostructure 112 contains active materials and, in certain embodiments, other materials configured to enhance conductivity (e.g., dopants), structural integrity, adhesion to the substrate, and other properties of the nanostructures. The nanostructures may be functionalized during or after deposition, e.g., forming core-shell arrangement with other materials, pre-loaded with lithium.

In these and other embodiments, an intermediate layer may be used to protect the substrate 102 from interacting with materials in the catalyst islands 104a and, as well, the nanostructures 112, precursors 106 and released reaction products 119 during the VLS-type deposition process, and during functionalization. For example, a gold-containing catalyst may be used to deposit silicon nanowires. However, depositing gold on a copper substrate leads to formation of a gold-copper alloy, which may negatively impact the catalytic effect and require more gold to be deposited. Further, copper may form silicides when exposed to silane, silicon tetrachloride, or other silicon containing precursor gas. Copper silicides are generally not desirable in silicon based electrodes due to it poor mechanical and undesired electrochemical properties.

Providing an intermediate layer allows using various substrate materials that otherwise would react or with precursor gases (e.g., silane) or form alloys with the deposited materials during or after the deposition. For example, depositing silicon nanowires directly on a copper or nickel substrate may result in formation of undesirable silicides. An intermediate layer serves as a barrier during deposition and prevents contact between such substrates and precursors gases. As a result, a number of possible material alternatives for substrates is greatly increased.

In certain embodiments, pre-fabricated nanostructures are bonded (e.g., fused or sintered) to the substrate surface using a combination of heat and pressure or other techniques. An intermediate layer may enhance the bonding formed by these techniques. In other embodiments, substrate-rooted nanostructures are formed by depositing a bulk layer of the active material onto the substrate and then selectively etching parts of the layer forming substrate-rooted nanostructures. A substrate may need to be protected from etchants in this embodiments, e.g., using an intermediate barrier layer.

In certain other embodiments, high capacity materials may be bound to the substrate using polymeric binders. An intermediate layer deposited on the substrate may allow using binders to accommodate for excessive swelling of high capacity materials yet to maintain a sufficient electrical and mechanical communication with the substrate. For example, an intermediate layer may be used to increase substrate surface roughness. In other embodiments, an intermediate layer includes functional groups on its surface that provide better adhesion of the polymer to the substrate. It should be understood that embodiments relying on binders will not typically provide a substrate-rooted structure nor will they provide a metallurgical bond between the substrate and the active materials nanostructures.

In certain embodiments, pre-synthesized (e.g., preformed) nanoparticles are deposited on the substrate followed by thermal annealing steps to form metallurgical connections between the nanoparticles and substrates. An intermediate layer may be used to assist during this bond formation or other parts of the overall process.

Structure and Materials of Intermediate Layer

An intermediate layer may be used as a diffusion barrier. For example, an intermediate layer may prevent substrate materials from diffusing into (and thereby degrading the performance of) catalysts used to grow active material nanostructures. Additionally, in some cases, the intermediate layer may prevent interaction between the substrate and active material precursors and/or other reagents used during active material fabrication and other processing operations. Further, the intermediate layer may enhance adhesion of the active material to the substrate, especially when nanostructures undergo substantial volume change during cycling. Still further, an intermediate layer may provide, e.g., an epitaxial or chemical-bond connection between the substrate and active material nanostructures (to address a lattice mismatch and reduce strain), and/or a thermal expansion coefficient that allows electrode sub-assemblies to be brought from processing temperatures (e.g., deposition temperature, post-deposition treatment temperatures) to the room temperature without causing fractures at the substrate-active material interface, and be electrically conductive. An intermediate layer could facilitate or accelerate nanowire growth since surface roughness and wetability between the intermediate layer and catalyst islands can be optimized by choosing different deposition process and different intermediate materials. An intermediate layer may be also used to promote mechanical integrity during a roll to roll or other method of fabrication (e.g., prevent deformation because of a high temperature, high tension environment).

Selection of materials for an intermediate layer depends on substrate materials, active materials, contact/attachment conditions, targeted functionality of the intermediate layer, and other parameters. Examples of intermediate layer materials include refractory metals, such as tungsten, molybdenum, niobium, tantalum, rhenium, tungsten nitride, tungsten carbide, titanium, titanium oxide, titanium nitride, titanium carbide, zirconium, zirconium nitride, tantalum, tantalum nitride, cobalt, ruthenium, indium oxide, cadmium, hafnium, tellurium, tellurium oxide, tellurium nitride, chromium, iron, chromium oxide, a titanium-tungsten combination, an iron-tungsten combination, a cobalt-tungsten combination, molybdenum, nickel, lithium and others. A thickness of the intermediate layer may be between about 1 nanometer and 5 micrometers, more specifically between about 5 nanometers and 1 micrometer, even more specifically between about 25 nanometers and 100 nanometers. Introducing certain materials into the layer, such as copper nickel, chromium, and titanium may improve adhesion of deposited nanostructures to the substrate surface. The thickness generally depends on functionality required from the layer and corresponding properties of the materials included in the layer. In certain embodiments, the intermediate layer has a contact resistance per unit surface area of the layer that is less than about 10 Ohm-centimeter squared or in more specific embodiments less about 5 Ohm-centimeter squared. A resistance over a unit of surface area is defined as a resistivity of the intermediate layer materials multiplied by a thickness of the layer.

In certain embodiments, an intermediate layer includes tungsten having a thickness of between about 150 nanometers and 250 nanometers. Tungsten does not form alloys with many materials that can be used as a catalyst to deposit high capacity nanostructured materials. In other embodiments, a composite intermediate layer is used containing a sub-layer of tungsten containing material (e.g., between about 150 nanometer and 250 nanometer thick) and a sub-layer of titanium containing material (e.g., between about 1 nanometers and 50 nanometers thick). The titanium sub-layer may be used to enhance adhesion of the intermediate layer to the substrate. Intermediate layers described above may be used with copper and nickel substrates.

In certain embodiments, an intermediate layer includes chromium and has a thickness of between about 500 nanometers and 1,500 nanometers. While chromium forms an alloys with gold (and possible can not be used with this type of catalyst), it can be successfully used with other catalyst and be deposited over copper, nickel, and silver substrate layers.

Figure 2:
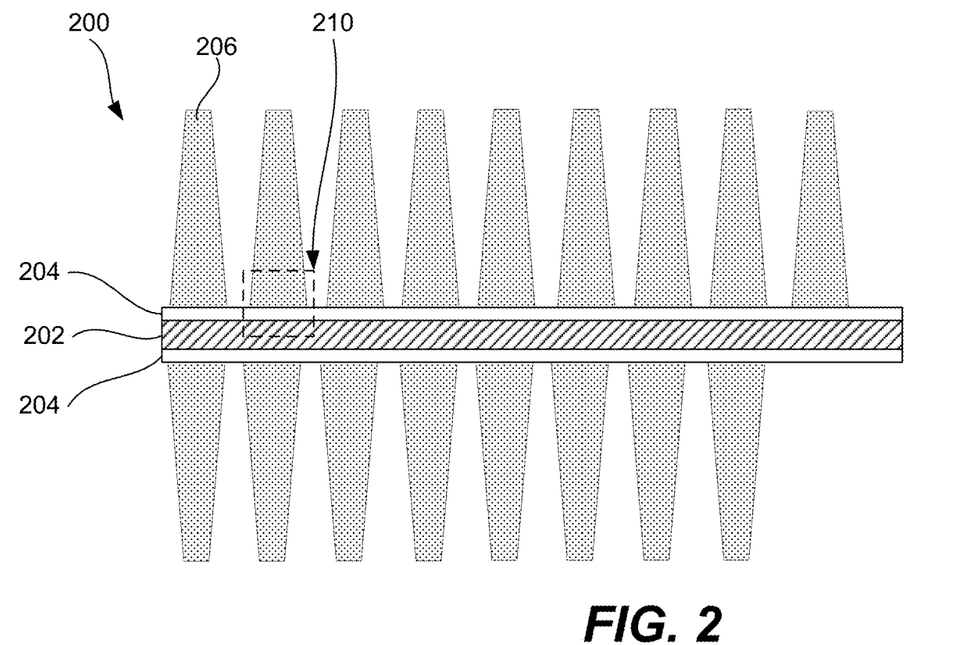
FIG. 2 is a schematic representation of an electrode cross-section containing active materials, a substrate, and an intermediate layer in accordance with certain embodiments.
Figure 3:
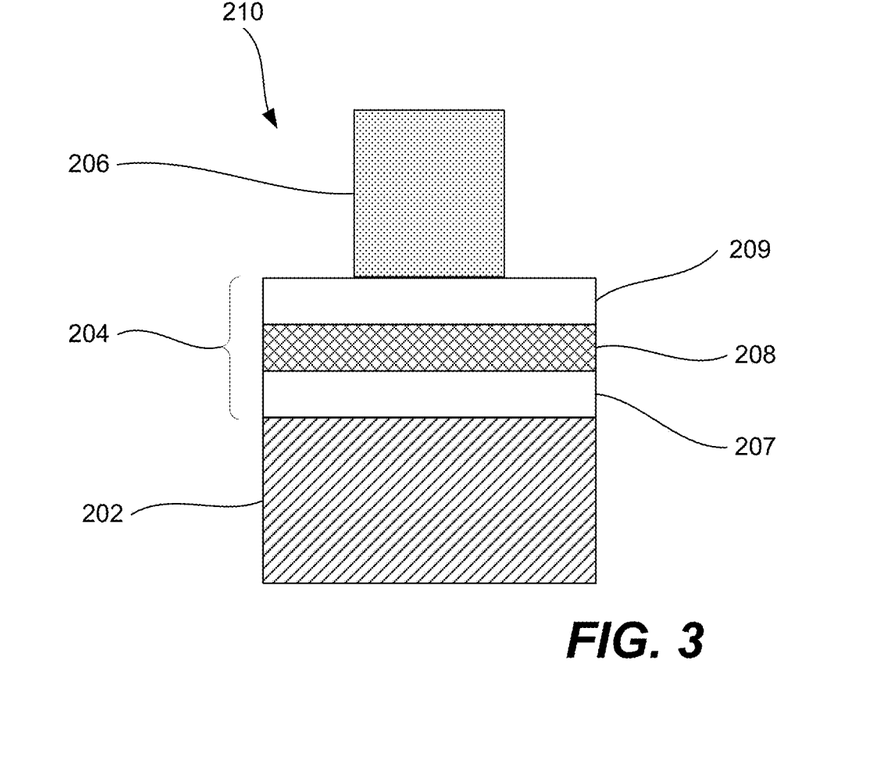
FIG. 3 is an expanded schematic representation of a portion of an electrode cross-section further illustrating certain details of an intermediate layer in accordance with certain embodiments.

In certain embodiments, the electrode includes multiple intermediate layers that form a stack. Each of these layers may contain the same or different materials. A stack of the intermediate layers may also be referred to as a "barrier system". For examples, FIG. 2 illustrates a schematic cross-section of an electrode 200 with a stack 204 that is positioned between the substrate 202 and the active material nanostructures 206. FIG. 3 illustrates an expanded view of an electrode portion 210 with a stack 204 containing three layers 208, 210, and 212. It should be understood that a stack may include any number of intermediate layers (e.g., 1, 2, 3, 4, 5, or 6). A number of layers may depend on materials used, deposition techniques, and targeted functionality. In certain embodiments, a composite intermediate layer is used, for example, as a combination of an adhesion layer and a diffusion barrier, as a combination of a diffusion barrier and a nucleation surface layer, as a combination of an adhesion layer, a diffusion barrier, and a nucleation surface layer, and in a case where two materials provide better diffusion barrier than just one (e.g., synergistic diffusion barrier effects).

In certain embodiments, one layer in a stack may be used to improve adhesion of the nanostructures to the substrate. In more specific examples, one layer (e.g., layer 207 in FIG. 3) may be used to improve adhesion of the substrate to the stack, while another layer (e.g., layer 209 in FIG. 3) may be used to improve adhesion of the nanostructures to the stack. Examples of materials for such layers include chromium, titanium, tungsten, tantalum, nickel, and molybdenum. An adhesion layer may be chosen to accommodate substantial swelling of the nanostructure base, while the substrate remains substantially static.

A layer, for example layer 208 in FIG. 3, may be used as a diffusion barrier. This layer may prevent the substrate from interacting with catalyst islands, precursors, and reaction products. In certain embodiments, an intermediate layer (e.g., layer 209 in FIG. 3), may be used to assist in formation of catalyst islands during the VLS and/or VSS deposition process. For example, a layer may be used to modify surface properties of the substrate to provide adequate surface tension so that the catalyst islands are agglomerated or aggregated. In other embodiments, the layer may be used to prevent substrate damage during lithographic etching, ablation, and other methods of forming catalyst islands.

In certain embodiments, an intermediate layer or a portion of the intermediate layer (e.g., a top sub-layer, such as layer 209 in FIG. 3) has a surface condition that facilitates nucleation of the nanostructures deposited onto the substrate, or more specifically onto the intermediate layer of the substrate. The surface condition may be created as a part of an overall catalyst island formation operation or a separate operation. As understood, in VLS or VSS deposition methods a solution containing an active material (or a precursor thereof) precipitates a solid phase containing the active material when the concentration of the active material in the solution reaches a certain high level. Initiation of this precipitation can be controlled, to a certain degree, by controlling the surface properties of the intermediate layer in the contact with the solution. Examples of these properties include surface roughness, surface polarization, surface tension, and morphology of the surface materials (e.g., crystalline, amorphous, lattice size and orientation). These properties can be controlled by selecting certain materials for an intermediate layer (or portions thereof). Examples of such materials include chrome, tungsten, nickel, molybdenum, iron, as well as mixtures and alloys containing one or more of these materials. Further, these properties can be controlled by using certain deposition methods and controlling process parameters during the deposition. Examples of deposition methods include sputtering, electrodeposition (e.g., electroless deposition, pulse-plating), evaporation, chemical vapor deposition (CVD), physical vapor deposition (PVD), and atomic layer deposition (ALD). In certain embodiments, a post-deposition treatment, such as back-plating, electro-etching, resputtering, CVD, annealing, plasma etching, and oxidation, is used to further control properties of the intermediate layer. While the specific surface condition(s) chosen to facilitate nucleation will depend on the composition of the intermediate layer, the active material, and the catalyst (if any), generally a surface having a surface roughness of at least about 0.01 μm R, more specifically at least about 0.05 μm R, or at least about 0.1 μm R. Frequently, surface conditions that match properties of the active material will be preferred. For example, substantially similar lattice constants, polarizations, surface tensions, etc. for the intermediate layer and active material are preferred.

Process

Figure 4:
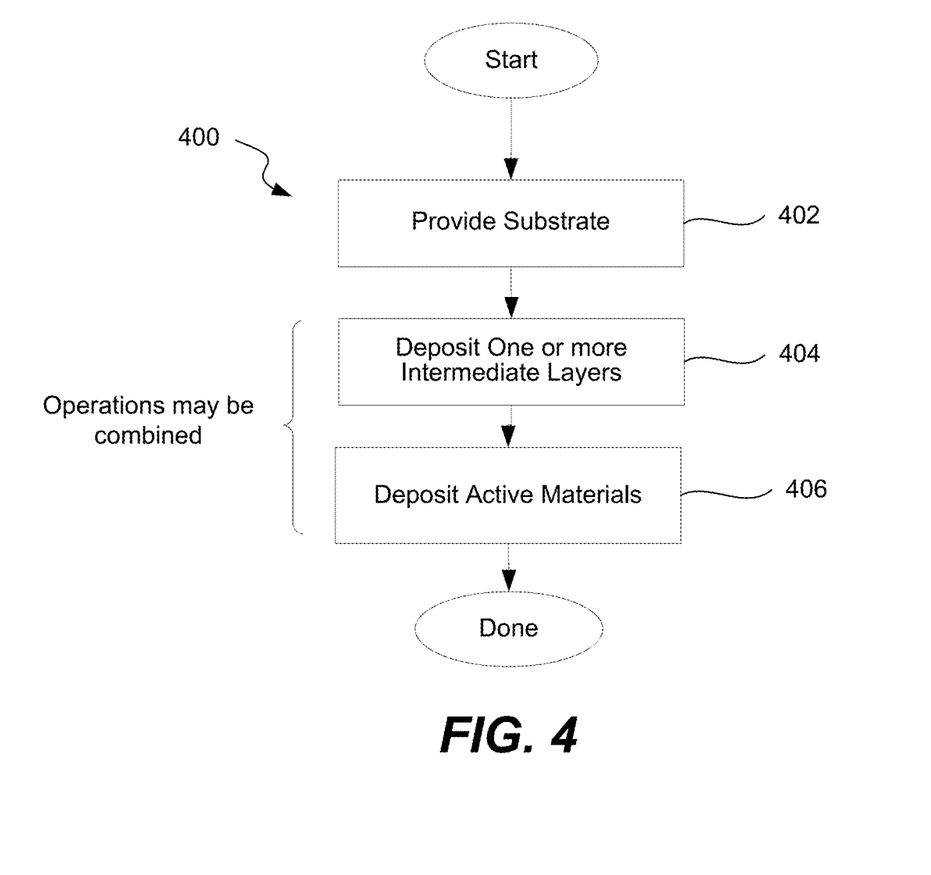
FIG. 4 is a flow chart of a general process for fabricating an electrode containing an intermediate layer in accordance with certain embodiments.

FIG. 4 illustrates a flow chart of a general process 400 for depositing active material on a substrate with one or more intermediate layer positioned between the substrate and the active material(s). The process 400 may start with providing a substrate (block 402). In certain embodiments, a substrate may be provided into a processing chamber, such a CVD apparatus, in a roll-to-roll format. A deposition area of the substrate is generally preheated to a predetermined temperature established by deposition conditions of the intermediate layer and/or active materials.

The process 400 may continue with depositing one or more intermediate layers (block 404). In certain embodiments, intermediate layer materials are deposited using a Physical Vapor Deposition, a Chemical Vapor Deposition, electrodeposition, or any other suitable deposition technique. For example, a layer of titanium and/or titanium nitride may be deposited using a sputtering target containing titanium as well as evaporation, sputtering, plating, laser ablation, Atomic Layer Deposition, and Chemical Vapor Deposition. This deposition operation (block 404) may be followed by one or more post deposition treatment operations, such as back-plating/electro-etching, resputtering, CVD treatment, annealing, plasma etching, and oxidation. For example, surface properties of the intermediate layer may need to be controlled to allow formation of the catalyst islands and/or nucleation of the active material during active material deposition operation 406. In certain embodiments, intermediate layer deposition operation 404 and/or post-deposition treatment may be repeated a number of times to build an intermediate layer stack as, for example, shown in FIG. 4.

The process 400 may continue with depositing active materials (block 406). Details of some embodiments of this operation are described in U.S. patent application Ser. No. 12/437,529 filed on May 7, 2009, which is incorporated by reference herein in its entirety for purposes of describing an operation for depositing active materials.

In certain embodiments, particularly those involving a VLS or VSS process, the deposition operation 406 starts with depositing catalyst islands on the substrate surface. In addition to single material catalyst embodiments, catalyst islands may include two or more materials (e.g., binary catalysts, tertiary catalysts, etc.). Besides modifying catalytic functions, a combination of catalyst may lead to changes in eutectic properties, rheological properties (e.g., viscosity, surface tension), and other described above.

In certain embodiments, deposition processes other than a VLS may be used to deposit active materials in operation 406. Certain examples are described above.

It should be noted that the above mentioned operations could be implemented on a single apparatus or a series of apparatus such that operations are performed soon after completion of the previous operation. For example, an apparatus may include one or more sputtering stations for adding intermediate layer and catalyst materials and one or more CVD stations for depositing active material nanostructures onto the moving web. In other embodiments, different apparatuses may be used for one or more of theses. A period of time may pass before two sequential operations, in which case, a partially manufactured electrodes may need to be protected from the storage environment by adding a protective layer.

Sub-Assembly: Electrodes with Separators

Two common arrangements of the electrodes in lithium ion cells are wound and stacked. One goal is to position and align the surfaces of active layers of the two electrodes surfaces as close as possible without causing an electrical short. Close positioning allows lithium ions to travel more rapidly and more directly between the two electrodes leading to better performance.

Figure 5A:
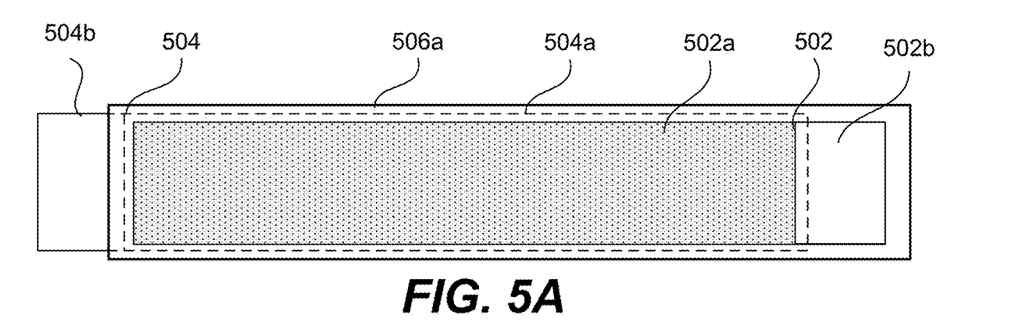
FIGS. 5A and 5B are a top schematic view and a side schematic view of an illustrative electrode arrangement in accordance with certain embodiments.

FIG. 5A illustrates a side view of an aligned stack including a positive electrode 502, a negative electrode 504, and two sheets of the separator 506a and 506b in accordance with certain embodiments. The positive electrode 502 may have a positive active layer 502a and a substrate portion 502b not coated with a positive active material (but may include an intermediate layer coating), i.e., an uncoated portion. Similarly, the negative electrode 504 may have a negative active layer 504a and a negative substrate portion 504b not coated with a negative active material (but may include an intermediate layer coating), i.e., an uncoated portion. In many embodiments, the exposed area of the negative active layer 504a is slightly larger that the exposed area of the positive active layer 502a to ensure trapping of the lithium ions released from the positive active layer 502a by intercalation material of the negative active layer 504a. In one embodiment, the negative active layer 504a extends at least between about 0.25 and 5 mm beyond the positive active layer 502a in one or more directions (typically all directions). In a more specific embodiment, the negative layer extends beyond the positive layer by between about 1 and 2 mm in one or more directions. In certain embodiments, the edges of the separator sheets 506a and 506b extend beyond the outer edges of at least the negative active layer 504a to provide electronic insulation of the electrode from the other battery components. The positive uncoated portion 502b may be used for connecting to the positive terminal and may extend beyond negative electrode 504 and/or the separator sheets 506a and 506b. Likewise, the negative uncoated portion 504b may be used for connecting to the negative terminal and may extend beyond positive electrode 502 and/or the separator sheets 506a and 506b.

Figure 5B:
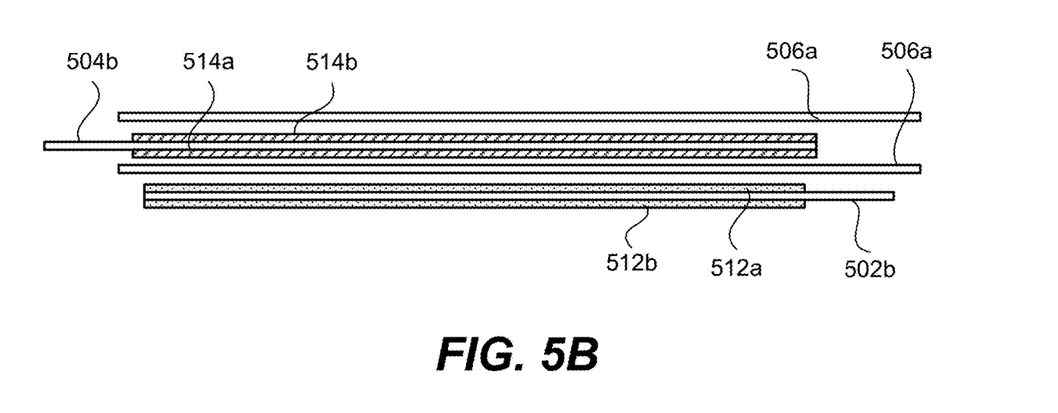

FIG. 5B illustrates a top view of the aligned stack. The positive electrode 502 is shown with two positive active layers 512a and 512b on opposite sides of the flat positive current collector 502b. Similarly, the negative electrode 504 is shown with two negative active layer 514a and 514b on opposite sides of the flat negative current collector. Any gaps between the positive active layer 512a, its corresponding separator sheet 506a, and the corresponding negative active layer 514a are usually minimal to non-existent, especially after the first cycle of the cell. The electrodes and the separators are either tightly would together in a jelly roll or are positioned in a stack that is then inserted into a tight case. The electrodes and the separator tend to swell inside the case after the electrolyte is introduced and the first cycles remove any gaps or dry areas as lithium ions cycle the two electrodes and through the separator.

Figure 6A:
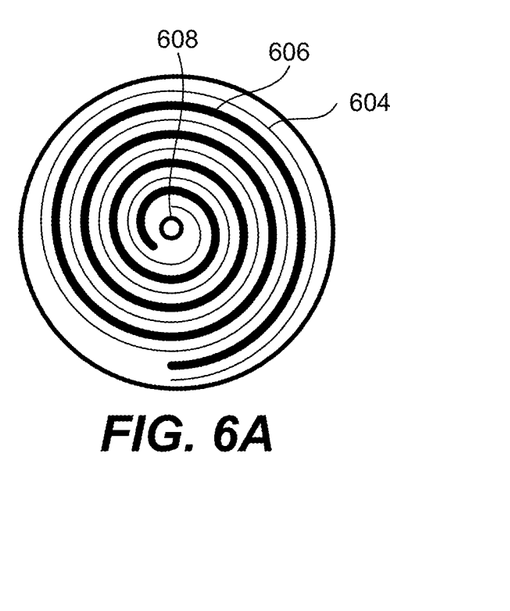
FIGS. 6A and 6B are a top schematic view and a perspective schematic view of an illustrative round wound cell in accordance with certain embodiments.
Figure 6B:
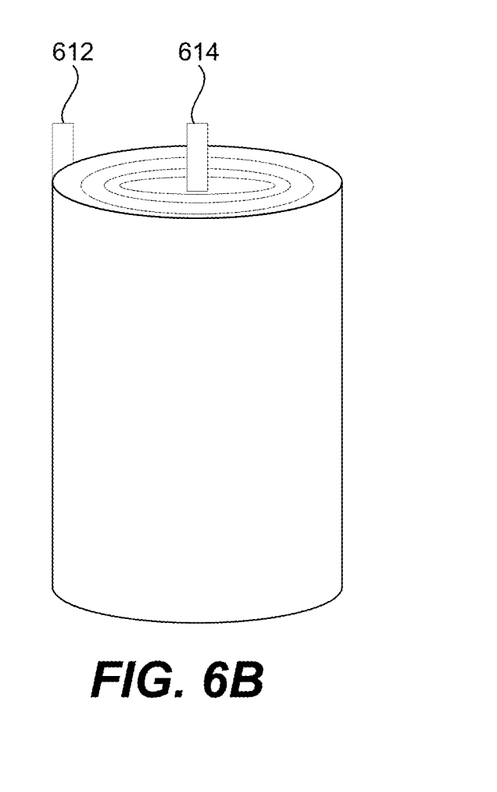

A wound design is a common arrangement. Long and narrow electrodes are wound together with two sheets of separator into a sub-assembly, sometimes referred to as a jellyroll, shaped and sized according to the internal dimensions of a curved, often cylindrical, case. FIG. 6A shows a top view of a jelly roll comprising a positive electrode 606 and a negative electrode 604. The white spaces between the electrodes represent the separator sheets. The jelly roll is inserted into a case 602. In some embodiments, the jellyroll may have a mandrel 608 inserted in the center that establishes an initial winding diameter and prevents the inner winds from occupying the center axial region. The mandrel 608 may be made of conductive material, and, in some embodiments, it may be a part of a cell terminal. FIG. 6B presents a perspective view of the jelly roll with a positive tab 612 and a negative tab 614 extending from the jelly roll. The tabs may be welded to the uncoated portions of the electrode substrates.

The length and width of the electrodes depend on the overall dimensions of the cell and thicknesses of active layers and current collector. For example, a conventional 18650 cell with 18 mm diameter and 65 mm length may have electrodes that are between about 300 and 1000 mm long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets negative effecting lithium ion transport between the electrodes. Nevertheless, in certain applications, such as those dictated by rectangular form factors, prismatic cells are appropriate. In some embodiments, prismatic cells employ stacks rectangular electrodes and separator sheets to avoid some of the difficulties encountered with wound prismatic cells.

Figure 7:
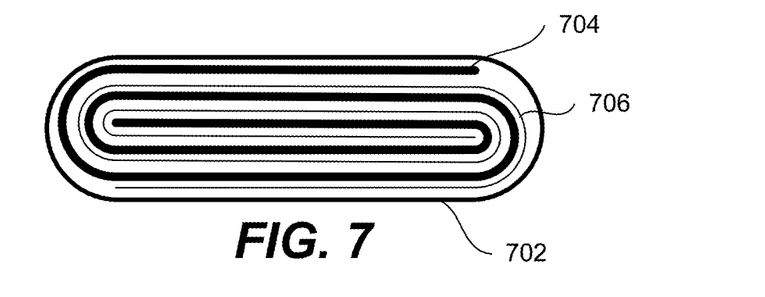
FIG. 7 is a top schematic view of an illustrative prismatic wound cell in accordance with certain embodiments.

FIG. 7 illustrates a top view of a wound prismatic jellyroll. The jelly roll comprises a positive electrode 704 and a negative electrode 706. The white space between the electrodes is representative of the separator sheets. The jelly roll is inserted into a rectangular prismatic case. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
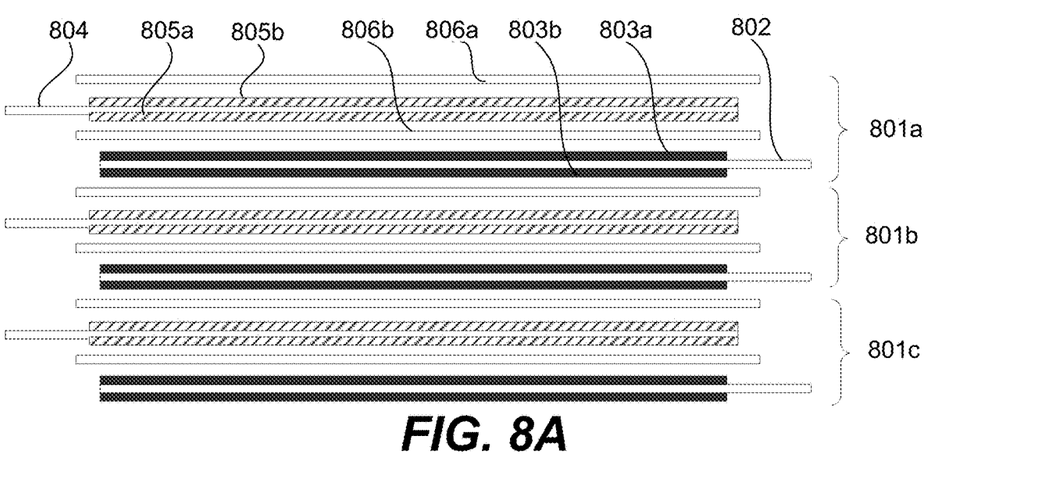
FIGS. 8A and 8B are a top schematic view and a perspective schematic view of an illustrative stack of electrodes and separator sheets in accordance with certain embodiments.
Figure 8B:
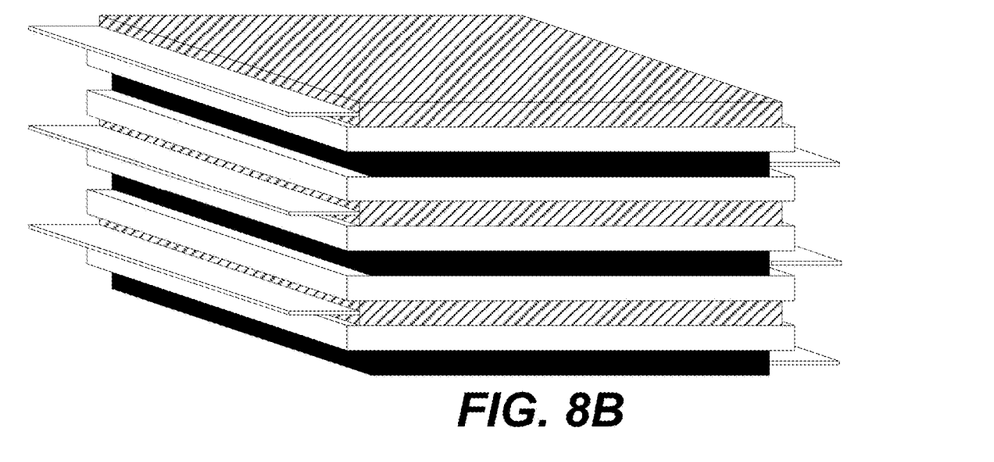

FIG. 8A illustrates a side view of a stacked cell including a plurality of sets (801a, 801b, and 801c) of alternating positive and negative electrodes and a separator in between the electrodes. One advantage of a stacked cell is that its stack can be made to almost any shape, and is particularly suitable for prismatic cells. However, such cell typically requires multiple sets of positive and negative electrodes and a more complicated alignment of the electrodes. The current collector tabs typically extend from each electrode and connected to an overall current collector leading to the cell terminal.

Housing

Figure 9:
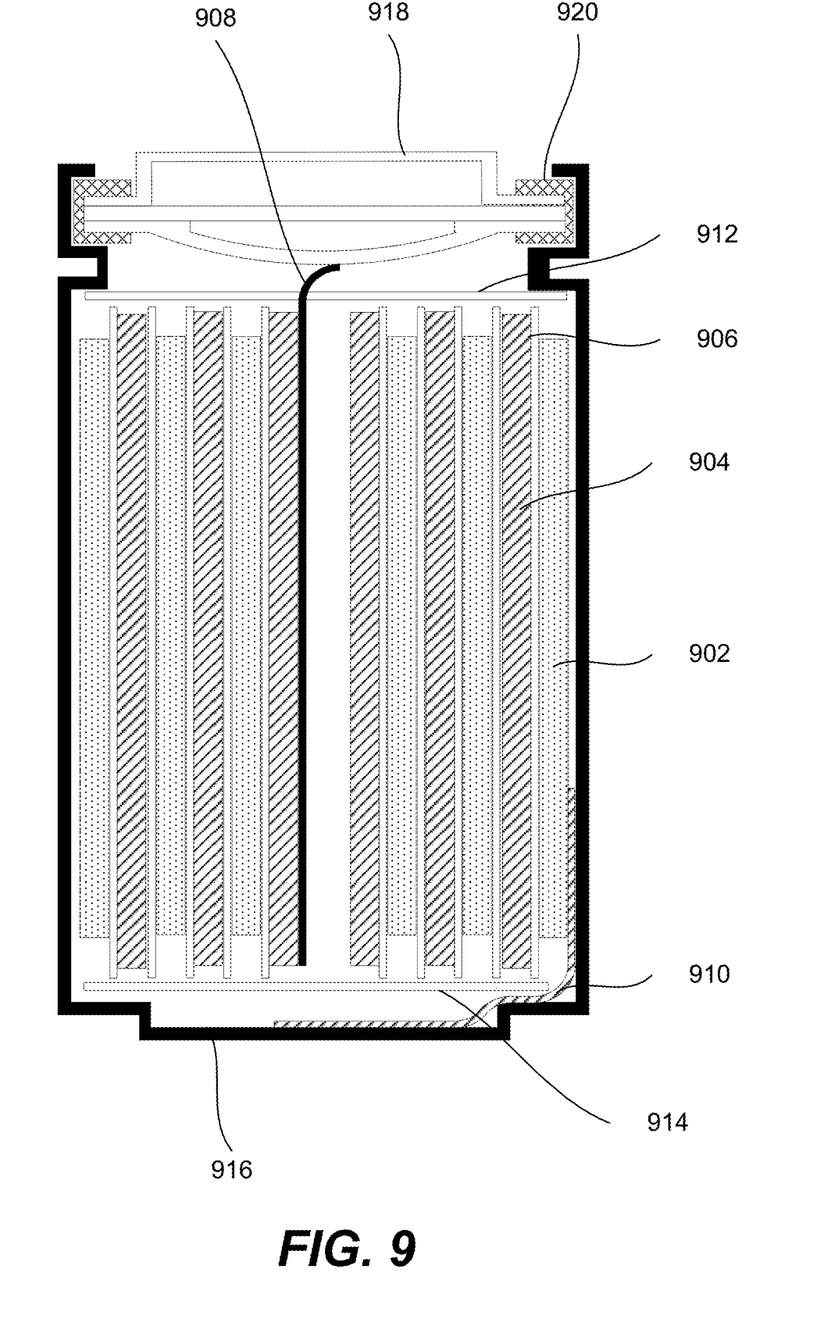
FIG. 9 is a schematic cross-section view of an example of a wound cell in accordance with embodiments.

FIG. 9 illustrates a cross-section view of the wound cylindrical cell in accordance with one embodiment. A jelly roll comprises a spirally wound positive electrode 902, a negative electrode 904, and two sheets of the separator 906. The jelly roll is inserted into a cell case 916, and a cap 918 and gasket 920 are used to seal the cell. In some cases, cap 912 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

CONCLUSION

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method of manufacturing a battery electrode for use in a lithium ion battery, the method comprising:
    providing a substrate having a metal surface;
    decomposing a silicon-containing gas to form silicon or silicon-containing material;
    alloying the silicon or silicon-containing material with the metal surface to form metal silicide nanostructures, wherein the metal silicide nanostructures are attached directly to the substrate; and
    after forming the metal silicide nanostructures, depositing amorphous silicon on the metal silicide nanostructures.

2. The method of claim 1, wherein the metal is nickel and the metal silicide is nickel silicide.

3. The method of claim 1, wherein the substrate comprises a layer of the metal, the layer of metal comprising the metal surface.

4. The method of claim 1, further comprising, prior to exposing the substrate to silicon-containing gas, roughening the metal surface.

5. The method of claim 1, wherein the silicon-containing gas is silane ($SiH_4$).

6. The method of claim 1, wherein the silicon-containing gas is a chlorosilane.

7. The method of claim 1, wherein the metal silicide nanostructures are nanowires.

8. A method of manufacturing a battery electrode for use in a lithium ion battery, the method comprising:
    providing a nickel substrate;
    exposing the nickel substrate to a silicon-containing gas;
    reacting nickel in the nickel substrate with the silicon-containing gas to form nickel silicide nanowires; and
    coating the nickel silicide nanowires with amorphous silicon.

9. The method of claim 8, wherein the silicon-containing gas is silane ($SiH_4$).

10. The method of claim 8, wherein the silicon-containing gas is a chlorosilane.

* * * * *